R. L. GLASS & H. S. WALKER.
AUTOMOBILE COOLER.
APPLICATION FILED DEC. 16, 1910.
1,036,484.
Patented Aug. 20, 1912.
2 SHEETS—SHEET 1.
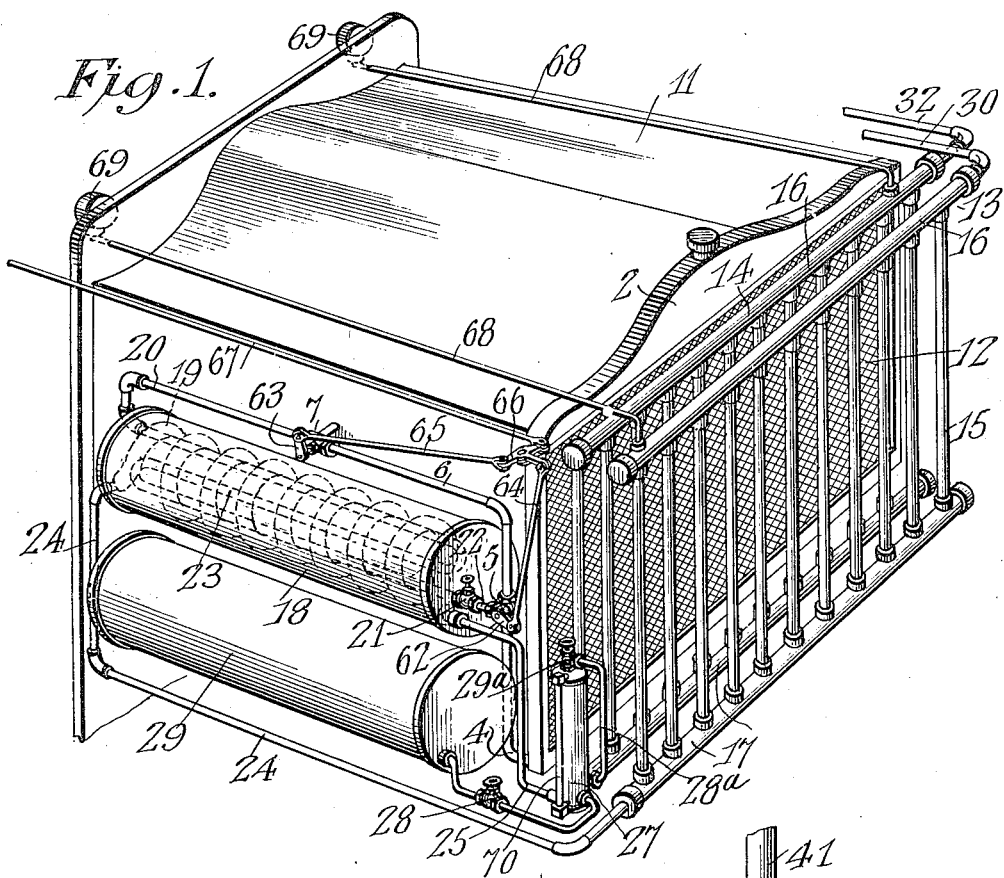
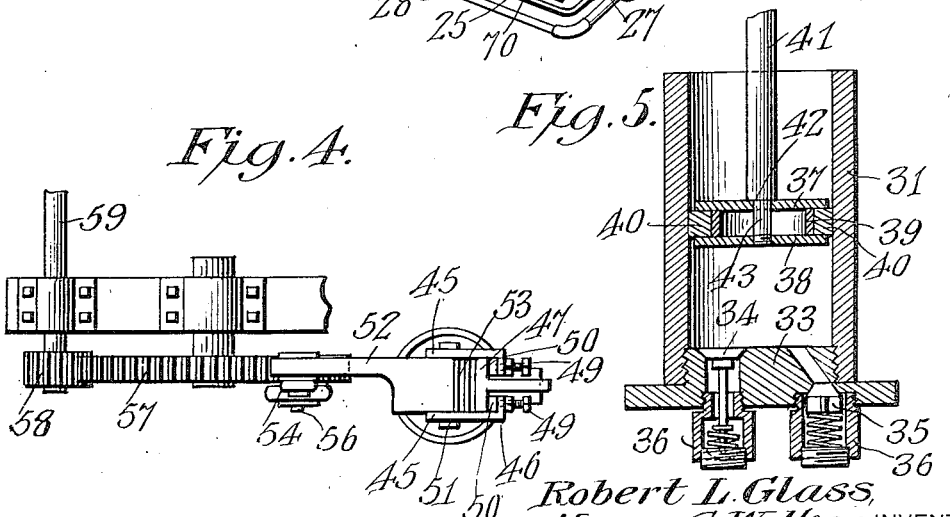
Robert L. Glass,
Harry S. Walker, INVENTORS
WITNESSES
BY
ATTORNEY

R. L. GLASS & H. S. WALKER.
AUTOMOBILE COOLER.
APPLICATION FILED DEC. 16, 1910.

1,036,484.

Patented Aug. 20, 1912.
2 SHEETS—SHEET 2.

WITNESSES
Jas. H. McCathran
F. T. Chapman.

Robert L. Glass,
Harry S. Walker, INVENTORS
BY
E. G. Siggers
ATTORNEY

UNITED STATES PATENT OFFICE.

ROBERT L. GLASS AND HARRY S. WALKER, OF CORVALLIS, OREGON; SAID WALKER ASSIGNOR TO SAID GLASS.

AUTOMOBILE-COOLER.

1,036,484.  Specification of Letters Patent.  Patented Aug. 20, 1912.

Application filed December 16, 1910. Serial No. 597,698.

*To all whom it may concern:*

Be it known that we, ROBERT L. GLASS and HARRY S. WALKER, citizens of the United States, residing at Corvallis, in the county of Benton and State of Oregon, have invented a new and useful Automobile-Cooler, of which the following is a specification.

This invention has reference to improvements in cooling means for automobiles, and its object is to provide a means whereby the ordinary cooling system may be supplemented at the will of the operator, so that in the event of the engines being loaded to or near their full capacity the temperature of the cylinders of the engines may be maintained at the desirable low point without the necessity of the constant presence of a cooling system of a capacity sufficient to take care of occasionally large demands upon the engines.

In accordance with the present invention there is provided a cooling system which may be of ordinary character, and be capable of properly cooling the engines under the more frequently employed loads, and such cooling system is supplemented by another cooling system so related to the first named cooling system as to cause a lowering of its normal temperature to counter-act higher temperatures due to the higher loading of the engines.

The invention will be best understood from a consideration of the following detailed description taken in connection with the accompanying drawings forming a part of this specification, with the understanding, however, that while the showing of the drawings is illustrative of a practical form of the invention, the latter is susceptible of various modifications while retaining the salient features of the invention.

Figure 2:
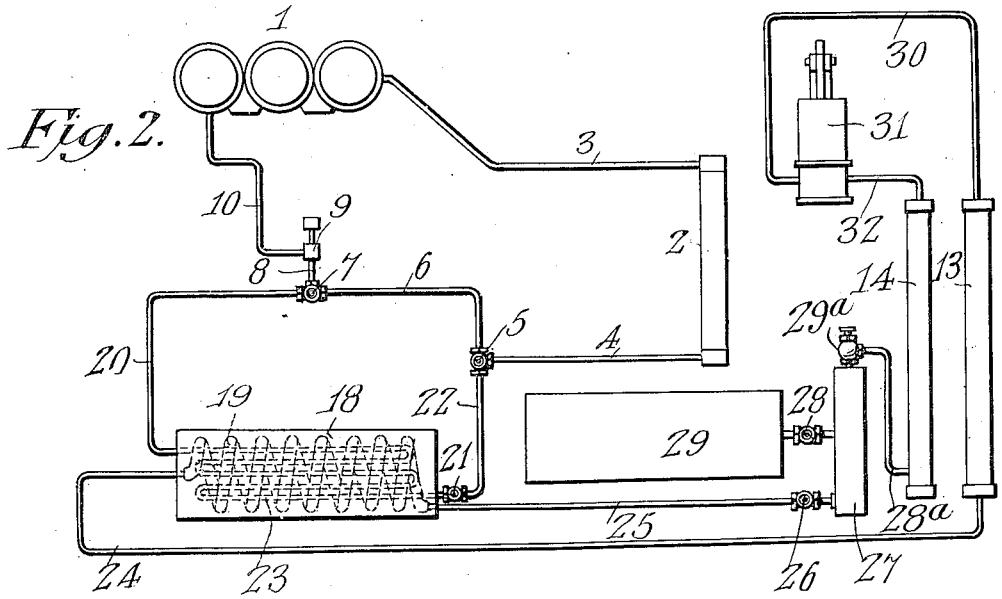
Figure 3:
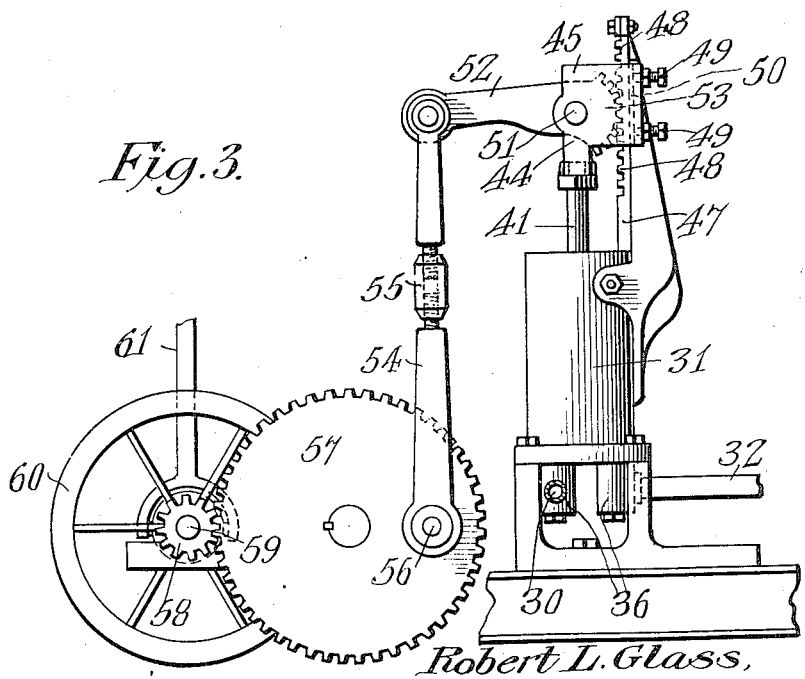

In the drawings:—Figure 1 is a perspective view of the bonnet of an automobile showing the invention applied. Fig. 2 is a diagram illustrating the circulatory arrangement of the cooling system. Fig. 3 is an elevation of an ammonia pump and driving means therefor used in connection with the invention. Fig. 4 is a plan view of the structure of Fig. 3. Fig. 5 is a diametric section through a portion of the ammonia pump.

Referring to the drawings, and more particularly to Fig. 2, there is shown an engine 1, the showing being merely diagrammatic and largely indicative, and may be taken as typical of any automobile engine wherein the cooling of the engine cylinders is brought about by the circulation of a suitable cooling medium through cooling jackets surrounding the engine cylinders, but it will be understood that the present invention is applicable to any other type of engine cooling means, it being common practice to employ water as a cooling agent or streams of air directed against radiating fins, or oil carried about the engine cylinders and like the water directed to a suitable radiator whereby the heat absorbed from the engine by the circulating medium is dissipated. Since the use of water as a cooling medium is common, such medium will be referred to hereinafter for the purposes of simplicity of description, with the understanding, however, that other cooling means may be employed.

In Fig. 2 there is indicated a radiator 2 which may be of any of the well known types, and on one side this radiator is connected by a pipe 3 to the water jackets of the cylinders 1 and on the other side this radiator is connected by a pipe 4 to a valve 5 from which latter there is branched a pipe 6 to another valve 7, and this last named valve is connected by a pipe 8 to a pump 9, such as is commonly employed in the circulating systems of automobiles. The pump 9 is connected by a pipe 10 to the side of the water jacket system of the engine 1 remote from the connection therewith of the pipe 3.

As so far described the circulatory system with the exception of the valves 5 and 7 is of the ordinary type and is usually confined within a bonnet 11 shown in Fig. 1, this bonnet constituting part of an automobile, which latter, however, is not shown but may be typified by the bonnet. As is customary, the front of the bonnet is provided with a grating 12, through which air may pass to the radiator, or this grating may be considered as part of the radiator itself, these features differing in different types of automobiles.

Arranged in front of the radiator 2 or the grating 12 are coolers 13, 14 made up of series of pipes 15 and headers 16, 17, respectively, the pipes 15 being upright and in parallel relation one to the other, and the headers 16 and 17 being arranged horizontally considering their relation to the automobile. The coolers 13 and 14 are arranged in parallel relation one to the other and to the radiator 2 or grating 12 in such position that when the automobile is traveling, air will pass by the coolers 13, 14 and thence to the radiator 2.

While it is not necessary to the working of the present invention that there be two coolers 13, 14, since one may under some circumstances answer the purpose, it is preferred to use two of such coolers and thereby obtain a large heat absorbing surface by which air in its passage through them becomes chilled before reaching the radiator 2.

Adjacent to the bonnet 11 is a brine tank 18 such as is used in connection with ammonia refrigerating plants, and within this tank there is located a coil 19 of pipe having at one end a continuation 20 connected to the valve 7, while at the other end this coil 19 is coupled to a valve 21, and from this last named valve there leads a pipe 22 to the valve 5.

Within the brine tank 18 there is lodged another coil 23 connected at one end to a pipe 24, and at the other end to a pipe 25. The pipe 24, in the particular arrangement shown, is connected at the end remote from the coil 23 to one of the headers 17 of one of the coolers, say the cooler 13. The pipe 25 is connected at the end remote from the coil 23 to a valve 26 which in turn is connected to a receiver 27 coupled through a valve 28 to an ammonia supply tank 29. The receiver 27 is coupled by a pipe 28$^a$ to the cooler 14, in the particular instance shown by way of the header 17 of said cooler, and this pipe 28$^a$ is provided with a valve 29$^a$.

The header 16 of the cooler 13 is connected by a pipe 30 to an ammonia pump 31 and the latter is also connected by a pipe 32 to the header 16 of the cooler 14.

The ammonia pump may be of any appropriate construction, but as shown comprises an appropriate cylinder open at one end and at the other end provided with a head 33 through which are ports controlled by valves 34, 35, respectively, the valve 34 constituting the inlet valve to the interior of the pump and the valve 35 constituting the outlet valve therefor, and the ports controlled by these valves lead into couplings 36 which are connected to the pipes 30 and 32, respectively.

Within the cylinder of the pump there is a piston comprising two plates 37, 38 separated by a spacing ring 39 and confining between them a packing ring 40 of suitable material, such as is commonly used in ammonia pumps and bearing against the inner walls of the pump cylinder. There is also provided a piston rod 41 formed at the end within the pump with a shoulder 42 bearing against the plate 37 and with a stem 43 passed through the plate 37 and threaded into the plate 38, so that the two plates are held together in proper relation to suitably clamp the packing ring 40. The piston rod 41 is connected to a slide 44 having cheek plates 45, each with an edge flange 46, the flange of one cheek plate being directed toward that of the other, and these flanges are in embracing relation to a standard 47 made fast to the cylinder of the pump 1 and provided on the edge toward the piston rod 41 with rack teeth 48. The flanges 46 carry set screws 49 adapted to engage filling-in strips 50 between the flanges 46 and the rear edge of that portion of the standard 47 containing the rack teeth 48.

Mounted between the cheek plates 45 by means of a pivot pin or bolt 51 is a lever 52 having formed on one edge a segmental gear 53 in engagement with the rack teeth 48, being held thereto by the flanges of the cheek plates and the filling-in strips 50. The lever 52 has a long arm on the side of the pivot pin 51 remote from the segmental gear 53, and to this long arm of the lever there is connected a pitman 54 formed of two members connected by a turn-buckle 55 so that the length of the pitman may be adjusted at will. The end of the pitman 54 remote from that connected to the lever 52 is connected by a wrist pin 56 to a gear wheel 57, and this gear wheel 57 is in mesh with a pinion 58 on a shaft 59 which may constitute the power shaft of the engine 1, this shaft usually carrying a fly-wheel 60, or if need be more than one fly-wheel. It is not mandatory that the pump 31 should be driven from the engine shaft in the manner shown, but may be driven in any suitable manner. Since it is not necessary that the ammonia pump should be driven at all times while the engine is running, a clutch indicated at 61 may be interposed between the shaft 59 and the pinion 58, and as such clutch may be of any suitable type, it is simply typified in the drawings, without any attempt to show any special structure.

The valves 5 and 7 have their valve stems provided with rock arms 62, 63, respectively, and these arms are connected by respective links 64, 65 to a common operating member 66 in turn connected to a link 67 which may extend to a point within easy reach of the operator, so that the valves 5 and 7 may be manipulated simultaneously when desired.

The headers 16 are connected by pipes 68 to gages 69, so located as to be readily observable by the operator.

Let it be assumed that the engine 1 is running under conditions where the cooling action of the radiator is sufficient. Under these circumstances the valves 5 and 7 may be set by the operator in a position whereby there is established a circulation from the engine 1 through the pipe 3 to the radiator 2, and thence back by the pipe 4, valve 5, pipe 6, valve 7, pipe 8, pump 9 and pipe 10 to the engine. Suppose that the cooling effect of the radiator 2 is insufficient to maintain the cooling medium circulating through the water jackets of the engine at the desired low temperature, as, for instance, when the engine is working under heavier load and more heat is generated in the engine cylinders. Under these circumstances the operator may manipulate the link 67 in a manner to move the valves 5 and 7 so as to couple the pipe 4 to the pipe 22 and the pipe 8 to the pipe 20, cutting out the pipe 6. There is now established a circulatory system from the engine 1 through the pipe 3 to the radiator 2, thence by the pipe 4 to the pipe 22 through the coil 19, thence by the pipe 20 to the pipe 8 and pump 9, returning to the engine by way of the pipe 10. When this path for the cooling medium is established, the ammonia pump 31 must be in action and consequently may then be coupled up to the engine to be driven thereby, and the pump 31 will condense the ammonia, driving it through the cooler 14 into the receiver 27, thence by way of the pipe 25 to the coil 23 within the brine reservoir 18, where it may expand to chill the brine, and thence the ammonia will travel by the pipe 24 to the cooler 13 and back by the pipe 30 to the pump. The cooling medium is chilled at the brine tank to a materially lower temperature than by the radiator 2, so that the engine may be chilled to a lower temperature, or if a greater degree of heat is established at the engine it may be maintained at the desired lower temperature, which is a materially lower temperature than would be produced by the radiator 2 alone under the circumstances assumed.

While the coolers 13 and 14 operate in the refrigerating system as condensers for the ammonia, their normal temperature may be materially less than that of the radiator 2 when the latter is in action, or even than the air passing by the coolers 13 and 14, and ultimately striking the radiator 2, so that the air reaching the radiator 2 may be in turn chilled before reaching such radiator and the heat dissipating effect of the radiator 2 be thereby enhanced.

It is feasible to maintain the ammonia pump in operation during the entire time the automobile engine is running, so that air passing to the radiator 2 is chilled by the coolers or condensers 13 and 14, and the brine or compound within the tank 18 may be maintained at a sufficiently low temperature so as to become effective immediately to the cooling medium when directed through the coil 19, the amount of power needed for maintaining the ammonia pump in constant action during the running of the automobile being so small as to be negligible. The reservoir 29 is provided for admitting fresh supplies of ammonia from time to time as may be needed to the ammonia circulatory system. The valves 21, 26 and 29 provide for the regulation of the flow of ammonia through the ammonia system as may be desired.

The receiver 27 may be provided with an indicating tube 70 whereby the quantity of liquid ammonia within the receiver may be ascertained at any time.

What is claimed is:—

1. The combination with an explosion engine, of a circulatory cooling system therefor including a heat dissipating radiator, an auxiliary chilling means for the cooling medium, and means for at will directing the cooling medium through the heat dissipating radiator to the exclusion of the auxiliary chilling means or for including the auxiliary chilling means in the circulatory cooling system of the engine.

2. A circulatory cooling system for explosion engines including a heat dissipating radiating means, a by-pass included in the cooling system, means for directing the cooling medium through the by-pass, and chilling means for the cooling medium including a portion of the by-pass.

3. A cooling system for explosion engines comprising circulatory pipes, heat dissipating means connected to said pipes, spaced valves in the pipes, a by-pass connected to and controlled by the valves, and chilling means in operative relation to a portion of the by-pass.

4. A cooling system for automobiles comprising circulatory pipes, radiating means included in said pipes, by-pass pipes leading from the circulatory pipes, valves at the junction of the by-pass pipes and the circulatory pipes for controlling the flow of cooling medium, a chilling tank inclosing a portion of the by-pass pipes, and an ammonia refrigerating system including the chilling tank.

5. A cooling system for automobiles comprising circulatory pipes, radiating means included in said pipes, by-pass pipes leading from the circulatory pipes, valves at the junction of the by-pass pipes and the circulatory pipes for controlling the flow of cooling medium, a chilling tank inclosing a portion of the by-pass pipes, and an ammonia refrigerating system including the chilling tank, said ammonia refrigerating system also including condensing means in operative relation to the radiating means of the circulatory system connected with the engine for cooling the latter.

6. A cooling system for explosion engines comprising circulatory pipes for a cooling medium, a radiator included therein, spaced valves in said circulatory pipes, by-pass pipes connected to said valves and including a coil, a brine tank inclosing said coil, an expansion coil in the brine tank, pipes connected to said expansion coil, an ammonia pump, condensers and connections between the condensers and the last named pipes.

7. A cooling system for automobile engines of the explosion type comprising a circulatory system including a heat dissipating radiator, a refrigerating system having condensing means in operative relation to the radiator to chill air passing thereto, refrigerating means included in the refrigerating system, and a by-pass from the cooling system having a portion in operative relation to the refrigerating means in the refrigerating system.

8. The combination with an explosion engine, of a cooling system therefor comprising a circulatory system for a cooling medium including a heat dissipating radiator and the jacket portions of the engine, and a refrigerating system independent of the circulatory cooling system of the engine, said refrigerating system including a compression pump and a refrigerating portion, the latter being in heat absorbing relation to the circulatory cooling system of the engine.

9. A cooling system for explosion engines comprising a circulatory system for a cooling medium including a heat dissipating radiator, a refrigerating system having a refrigerating means in operative relation to the circulatory system, and condensing means in heat absorbing relation to the heat radiator of the circulatory system.

10. A cooling system for automobile engines of the explosion type comprising a circulatory system provided with a heat radiator in position to be engaged by air streams caused by the travel of the automobile, a refrigerating system having condensing means also in position to be engaged by air streams caused by the travel of the automobile, and refrigerating means included in the refrigerating system in operative relation to the circulatory system.

11. A cooling system for automobile engines of the explosion type comprising a circulatory system provided with a heat radiator in position to be engaged by air streams caused by the travel of the automobile, a refrigerating system having condensing means also in position to be engaged by air streams caused by the travel of the automobile, refrigerating means included in the refrigerating system in operative relation to the circulatory system, and means for including or excluding the refrigerating means with relation to the circulatory system at will.

In testimony, that we claim the foregoing as our own, we have hereto affixed our signatures in the presence of two witnesses.

ROBERT L. GLASS.
HARRY S. WALKER.

Witnesses:
  MENTOR HOWARD,
  JAMES BLODGETT.